E. B. SHAFER.
ACTUATING DEVICE FOR TOY VEHICLES.
APPLICATION FILED OCT. 2, 1916.
1,239,729.
Patented Sept. 11, 1917.
2 SHEETS—SHEET 1.
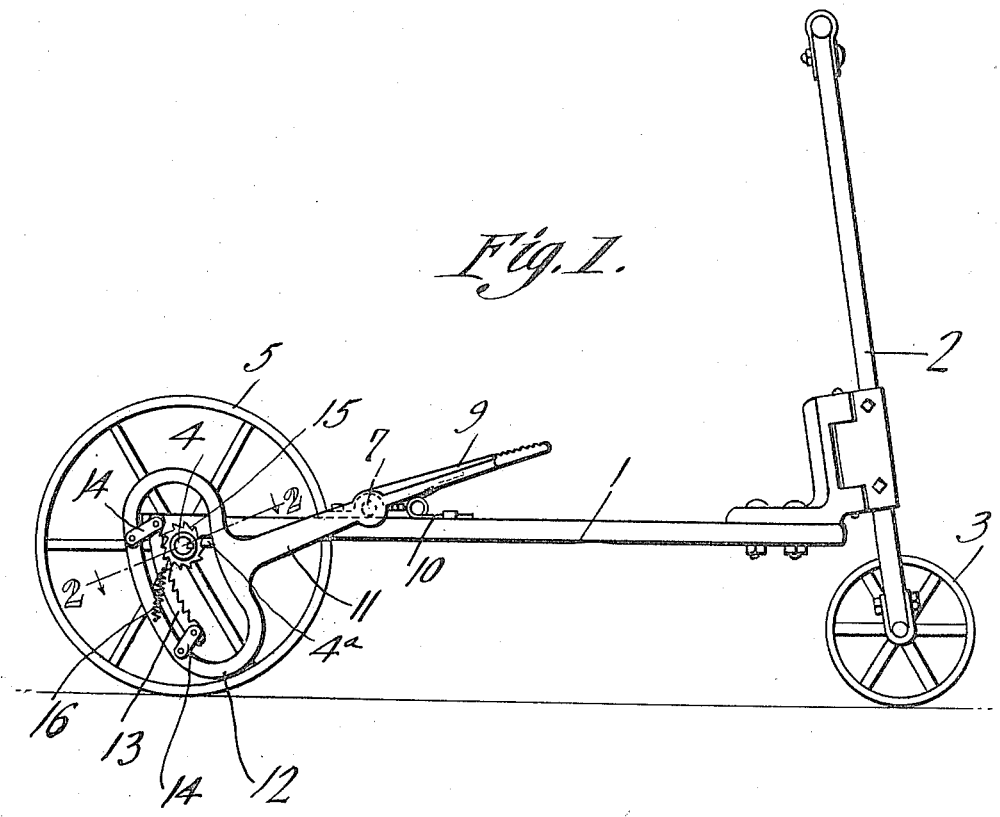
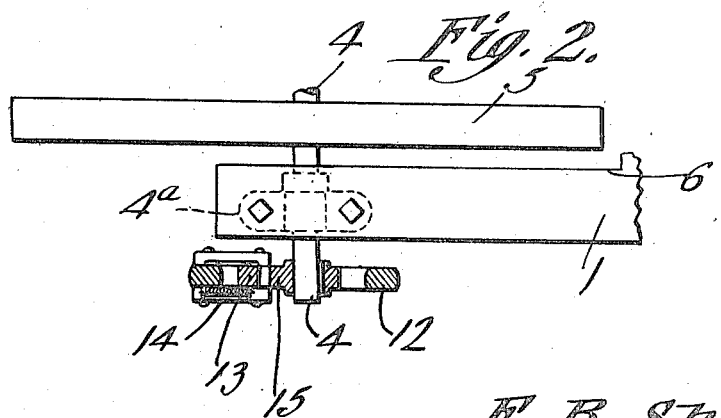
E. B. Shafer,
Inventor
Witnesses
by
Attorneys

E. B. SHAFER.
ACTUATING DEVICE FOR TOY VEHICLES.
APPLICATION FILED OCT. 2, 1916.

1,239,729.

Patented Sept. 11, 1917.
2 SHEETS—SHEET 2.

Witnesses

E. B. Shafer
Inventor
by
Attorneys

UNITED STATES PATENT OFFICE.

EDWARD B. SHAFER, OF DECATUR, ILLINOIS.

ACTUATING DEVICE FOR TOY VEHICLES.

1,239,729.  Specification of Letters Patent.  Patented Sept. 11, 1917.

Application filed October 2, 1916. Serial No. 123,344.

*To all whom it may concern:*

Be it known that I, EDWARD B. SHAFER, a citizen of the United States, residing at Decatur, in the county of Macon and State of Illinois, have invented a new and useful Actuating Device for Toy Vehicles, of which the following is a specification.

The present invention appertains to actuating means for toy vehicles, and aims to provide a novel and improved device for propelling a toy vehicle of the velocipede type embodying a wheel mounted body or foot board and novel means whereby the rider or operator by intermittently depressing a pedal, can propel the vehicle, the present device being especially for the entertainment and enjoyment of children.

It is also within the scope of the invention to provide a device of the nature indicated which is comparatively simple and inexpensive in construction, and which is practical and efficient in operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a side elevation of the improved vehicle.

Fig. 2 is an enlarged fragmental view, partly in section on the line 2—2 of Fig. 3.

Figure 3:
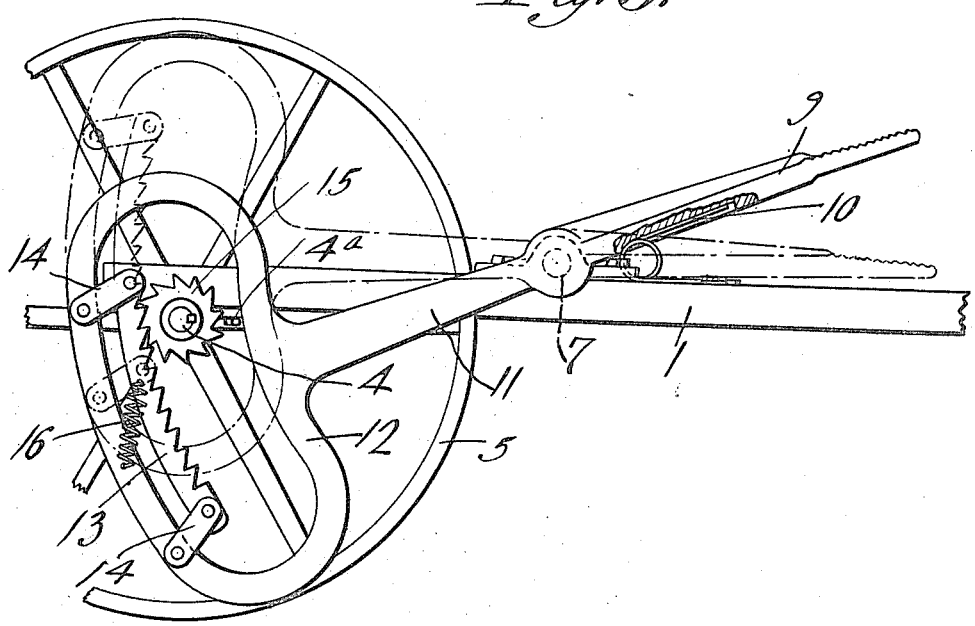
Fig. 3 is an enlarged fragmental elevation showing the device for connecting the pedal and rear axle.
Figure 4:
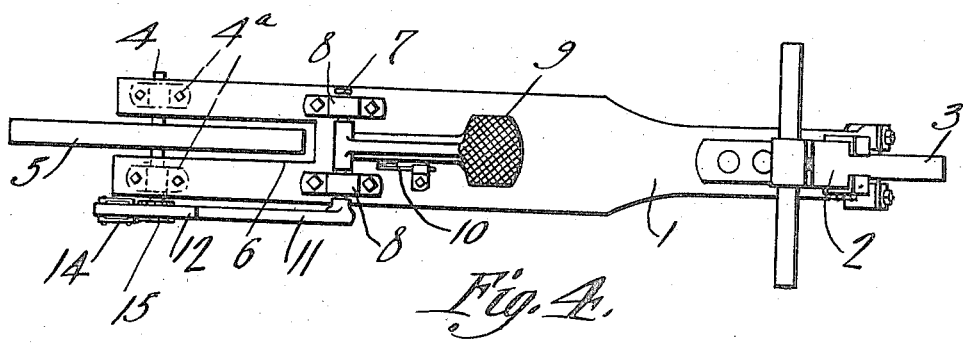
Fig. 4 is a plan view of the vehicle.

In carrying out the invention, there is provided a suitable body 1, preferably in the form of an elongated foot board upon which the operator can stand when operating the vehicle. A steering post 2 is hingedly or otherwise connected with the forward end of the foot board 1, and is provided at its lower end with a steering wheel 3, to enable the vehicle to be steered conveniently. A rear axle 4 is journaled in suitable bearings 4ª attached to the foot board 1 adjacent the rear end thereof, and a rear propelling wheel 5 is secured upon the axle or shaft 4 and is disposed within a slot 6 with which the foot board is provided, but it is to be understood that two rear wheels can be used instead of one if desired.

In order to operate the wheel 5, a transverse rock shaft 7 is journaled in bearings 8 secured upon the foot board in front of the wheel 5, and has attached thereto a forwardly projecting pedal 9 disposed above the foot board, and raised by means of a spring 10 when the pedal is released. Said pedal is so arranged as to be readily depressed by the operator. A rearwardly projecting arm 11 is attached to the rock shaft 7 and is provided at its rear end with an arcuate loop or yoke 12 surrounding the axle 4. An arcuate floating ratchet bar 13 is carried by the rear portion of the loop 12, links 14 connecting the ends of the ratchet bar 13 and the rear portion of the loop 12, to permit the ratchet bar to move upwardly and rearwardly relative to the loop 12 away from a ratchet wheel 15 secured upon the axle within the loop 12. When the ratchet bar 13 gravitates, it bears against the ratchet wheel 15, and to assure of the movement of the ratchet bar against the ratchet wheel, a spring 16 can be used to connect the ratchet bar with the loop 12 whereby to move the ratchet bar downwardly and hence forwardly into engagement with the ratchet wheel in rear of which the ratchet bar is disposed.

In operation, when the pedal 9 is depressed, it will swing the arm 11 upwardly, thereby raising the ratchet bar 13 which in engaging the ratchet wheel 15 will rotate the axle 4 and wheel 5 to propel the vehicle. It will be noted that the ratchet wheel can rotate without difficulty, the ratchet bar 13 being forced away from the ratchet wheel by the teeth thereof. When the pedal is released, it is swung upwardly under the influence of the spring 10, thereby moving the loop 12 downwardly, and the ratchet bar 13 can move upwardly and rearwardly relative to the loop 12 to enable the ratchet bar to be moved downwardly for a new operation. The operator can intermittently depress the pedal 9.

Instead of using a single pedal actuated device, two of them can be used, as will be apparent, by simply duplicating said devices, whereby one can be operated by each foot.

Having thus described the invention, what is claimed as new is:

1. In a device of the character described, a ratchet wheel, an oscillatory arm having a portion movable past the ratchet wheel, an arcuate ratchet bar engageable with the ratchet wheel, and links connecting both ends of said bar and said portion.

2. In a device of the character described, a ratchet wheel, an arm mounted for oscillatory movement and having a loop surrounding the ratchet wheel, an arcuate ratchet bar within the loop engageable with the ratchet wheel, and links connecting the ends of the ratchet bar and that portion of the loop remote from the fulcrum of said arm.

In testimony that I claim the foregoing as my own, I have hereto affixed my signature in the presence of two witnesses.

EDWARD B. SHAFER.

Witnesses:
T. M. SILKWOOD,
W. D. LIPE.

Copies of this patent may be obtained for five cents each, by addressing the "Commissioner of Patents, Washington, D. C."